US012720191B2

(12) United States Patent
Karagiannis et al.

(10) Patent No.: US 12,720,191 B2
(45) Date of Patent: Aug. 25, 2026

(54) CONTROLLING SENSOR ACTIVATION AND DEACTIVATION FOR ENERGY EFFICIENT LOCALIZATION

(71) Applicant: Telefonaktiebolaget LM Ericsson (publ), Stockholm (SE)

(72) Inventors: Ioannis Karagiannis, Kalamata (GR); José Araújo, Stockholm (SE); Amirhossein Taher Kouhestani, Solna (SE); Diego Gonzalez Morin, Galapagar (ES); Lars Andersson, Solna (SE); Ananya Muddukrishna, Enskededalen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 102 days.

(21) Appl. No.: 17/786,097

(22) PCT Filed: Dec. 17, 2019

(86) PCT No.: PCT/EP2019/085723
§ 371 (c)(1),
(2) Date: Jun. 16, 2022

(87) PCT Pub. No.: WO2021/121564
PCT Pub. Date: Jun. 24, 2021

(65) Prior Publication Data

US 2023/0033951 A1 Feb. 2, 2023

(51) Int. Cl.
*H04N 23/65* (2023.01)
*G01S 17/931* (2020.01)
(Continued)

(52) U.S. Cl.
CPC ......... *H04N 23/651* (2023.01); *G06F 1/1694* (2013.01); *G06F 1/3215* (2013.01);
(Continued)

(58) Field of Classification Search
None
See application file for complete search history.

(56) References Cited

U.S. PATENT DOCUMENTS

2011/0124349 A1* 5/2011 Midtun ................ H04W 4/029 340/8.1
2013/0229508 A1* 9/2013 Li ......................... G06F 1/3287 348/77

(Continued)

FOREIGN PATENT DOCUMENTS

CN 107205661 A 9/2017
CN 109556615 A 4/2019

(Continued)

OTHER PUBLICATIONS

International Search Report and Written Opinion mailed Aug. 27, 2020 for International Patent Application No. PCT/EP2019/085723, 11 pages.

(Continued)

*Primary Examiner* — Hung Q Dang
(74) *Attorney, Agent, or Firm* — Sage Patent Group

(57) ABSTRACT

A method by a device performing localization using a set of sensors that are transported with the device is disclosed. A confidence score is determined for each of the sensors among the set of sensors. A subset of the sensors is defined from among the set of sensors that are to remain active based on their respective confidence scores satisfying a defined threshold. The method deactivates the sensors within the set of sensors having confidence scores that do not satisfy the defined threshold. The deactivation includes controlling power consumption by deactivated ones of the sensors.

22 Claims, 6 Drawing Sheets

(51) Int. Cl.
*G06F 1/16* (2006.01)
*G06F 1/3215* (2019.01)
*G06F 1/3287* (2019.01)
*G06T 7/73* (2017.01)
*H04N 23/617* (2023.01)
*H04N 23/661* (2023.01)

(52) U.S. Cl.
CPC .............. *G06F 1/3287* (2013.01); *G06T 7/74* (2017.01); *H04N 23/661* (2023.01); *G06T 2207/10016* (2013.01)

(56) References Cited

U.S. PATENT DOCUMENTS

| | | | | |
|---|---|---|---|---|
| 2014/0011517 | A1 | 1/2014 | Lin et al. | |
| 2014/0240469 | A1* | 8/2014 | Lee | G01C 11/14 348/48 |
| 2014/0351559 | A1 | 11/2014 | Lautner et al. | |
| 2017/0336439 | A1* | 11/2017 | Li | G01S 5/0294 |
| 2018/0115711 | A1 | 4/2018 | Kato et al. | |
| 2018/0348843 | A1* | 12/2018 | de Cesare | G06F 1/3296 |
| 2019/0355169 | A1* | 11/2019 | Sapienza | G06V 20/70 |
| 2020/0409361 | A1* | 12/2020 | Herman | B60W 10/24 |

FOREIGN PATENT DOCUMENTS

| | | | |
|---|---|---|---|
| WO | 2019221580 | A1 | 11/2019 |
| WO | 2019221582 | A1 | 11/2019 |

OTHER PUBLICATIONS

R. Omar Chavez-Garcia, "Multiple Sensor Fusion for Detection, Classification and Tracking of Moving Objects in Driving Environments", Robotics [cs.RO], Universite de Genoble, 2014, 3 pages.

Stefan Leutenegger et al., "BRISK: Binary Robust Invariant Scalable Keypoints", Autonomous Systems Labs, ETH Zurich, Nov. 6-13, 2011, 8 pages.

Liefeng Bo et al., "Depth Kernel Descriptors for Object Recognition", 2011 IEEE/RSJ International Conference on Intelligent Robots and Systems (IROS 2011), Sep. 25-30, 2011, 6 pages.

Alexandre Alahi et al., "FREAK: Fast Retina Keypoint", 2012 IEEE Conference on Computer Vision and Pattern Recognition, Jun. 16-21, 2012, 8 pages.

Guangcong Zhang et al., "Good Features to Track for Visual SLAM", 2015 IEEE Conference on Computer Vision and Pattern Recognition, Jun. 7-12, 2015, 10 pages.

Martin Buczko et al., "How to Distinguish Inliers from Outliers in Visual Odometry for High-Speed Automotive Applications", 2016 IEEE Intelligent Vehicles Symposium (IV), Jun. 19-22, 2016, 7 pages.

Thomas Schneider et al., "Maplab: An Open Framework for Research in Visual-Inertial Mapping and Localization", IEEE Robotics and Automation Letters, vol. 3, No. 3, Jul. 2018, 8 pages.

Hassan Fourati and Krzysztof Iniewski (Eds.), "Multisensor Data Fusion: From Algorithms and Architectural Design to Applications", 1st Edition, 2016, CRC Press, https://doi.org/10.1201/b18851, 8 pages.

J.A. Castellanos et al., "Multisensor Fusion for Simultaneous Localization and Map Building", IEEE Transactions on Robotics and Automation, vol. 17, No. 6, Dec. 2001, 7 pages.

David Scaramuzza et al., "Visual Odometry—Part 1: The First 30 Years and Fundamentals", IEEE Robotics & Automation Magazine, Dec. 2011, 13 pages. .

Office Action mailed May 28, 2025 for Chinese Patent Application No. 201980103077.2, 13 pages.

Office Action mailed Dec. 24, 2024 for Chinese Patent Application No. 201980103077.2, 12 pages.

Qui, Meikang et al.; "Efficent Algorithm of Energy Minimization for Heterogeneous Wireless Sensor Network"; Proc. 2006 IEEE/IFIP International Conference on Embedded And Ubiquitous Computing (EUC'2006); Lecture Note in Computer Science (LNCS); Springer, Korea; Aug. 2006; 10 pages.

* cited by examiner

Figure 4

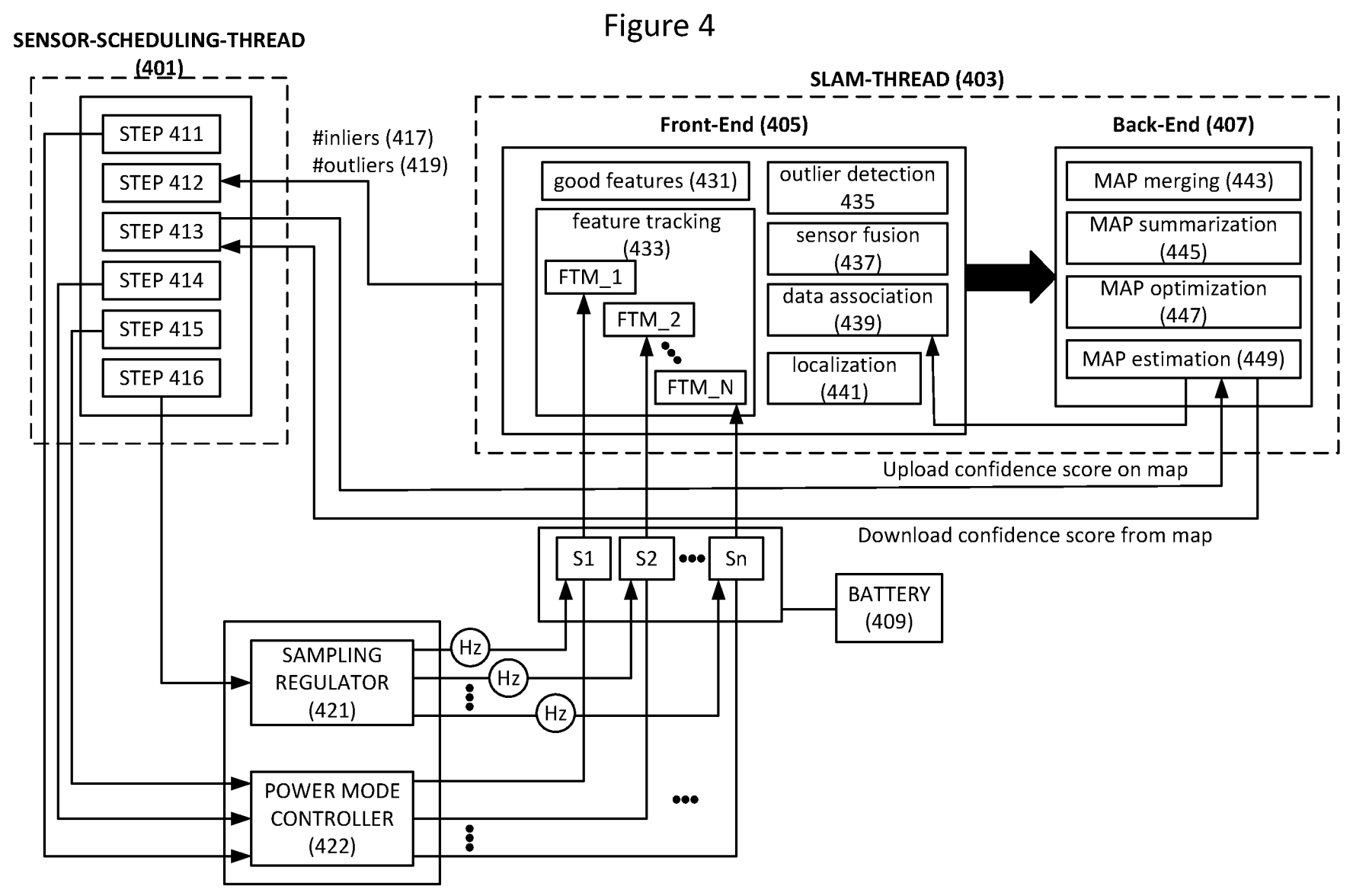

SLAM-THREAD (403)

Front-End (405)

good features (431)

feature tracking (433)

FTM_1

FTM_2

FTM_N outlier detection 435 sensor fusion (437)

data association (439)

localization (441)

Back-End (407)

MAP merging (443)

MAP summarization (445)

MAP optimization (447)

MAP estimation (449)

Upload confidence score on map

Download confidence score from map

BATTERY (409)

S1

S2

Sn

Hz

Hz

Hz

#inliers (417)

#outliers (419)

SAMPLING REGULATOR (421)

POWER MODE CONTROLLER (422)

SENSOR-SCHEDULING-THREAD (401)

STEP 411

STEP 412

STEP 413

STEP 414

STEP 415

STEP 416

CONTROLLING SENSOR ACTIVATION AND DEACTIVATION FOR ENERGY EFFICIENT LOCALIZATION

CROSS-REFERENCE TO RELATED APPLICATIONS

This application is a 35 U.S.C. § 371 national stage application of PCT International Application No. PCT/EP2019/085723 filed on Dec. 17, 2019, the disclosures and content of which are incorporated by reference herein in their entirety.

TECHNICAL FIELD

The present disclosure relates to controlling multi-sensor operation during localization of a device.

BACKGROUND

Localization and mapping algorithms, such as Simultaneous Localization and Mapping (SLAM) algorithms, can be used with a mobile device traveling with a plurality of sensors to simultaneously build a consistent geometric map and determine location of the mobile device within the map. Some localization and mapping algorithms utilize data from cameras and sometimes other types of sensors to increase robustness but can still fail to produce consistent maps in some environments. In visually degraded environments, e.g. dark room or tunnel, it is harder to extract useful information from a camera due to features being determined or recognized with a lower probability or not at all.

SUMMARY

Some embodiments disclosed herein are directed to a method by a device which is performing localization using a set of sensors that are transported with the device. The method includes determining a confidence score for each of the sensors among the set of sensors. The method defines a subset of the sensors among the set of sensors that are to remain active based on their respective confidence scores satisfying a defined threshold. The method deactivates the sensors within the set of sensors having confidence scores that do not satisfy the defined threshold. The deactivation includes controlling power consumption by deactivated ones of the sensors.

In some further embodiments, the method selectively deactivates individual ones of the sensors within the subset of sensors based on a determination of whether their respective utilization of hardware resources satisfies a defined rule. In some other further embodiments, the method regulates the sampling rate and/or resolution of the sensors among the subset that are active, based on speed of the device.

Some other embodiments disclosed herein are directed to a corresponding device that is configured for performing localization using a set of sensors that are transportable with the device. The device includes a memory storing program code that is executed by the processor to perform operations that include determining a confidence score for each of the sensors among the set of sensors. The operations also include defining a subset of the sensors among the set of sensors that are to remain active based on their respective confidence scores satisfying a defined threshold, e.g., being equal to or above a defined positive threshold value. The operations also include deactivating the sensors within the set of sensors having confidence scores that do not satisfy the defined threshold, e.g., being less than the defined positive threshold value. The deactivation includes controlling power consumption by deactivated ones of the sensors.

In some embodiments, the device further includes a transceiver. The operations performed by the processor can further include communicating through the transceiver with a proximately located device. The confidence score for one of the sensors is determined based on obtaining a listing of sensors that are presently active for use by the proximately located device.

A potential advantage that may be provided by these and other embodiments is that the deactivation and activation of sensors used for localization is controlled based on the individual confidence scores of the sensors, and can result in reduction in power consumption of the system and enable more optimized use of resources while continuing to satisfy ongoing localization performance requirements.

Other methods, devices, and corresponding computer program products according to embodiments will be or become apparent to one with skill in the art upon review of the following drawings and detailed description. It is intended that all such methods, devices, and corresponding computer program products be included within this description, be within the scope of the present disclosure, and be protected by the accompanying claims. Moreover, it is intended that all embodiments disclosed herein can be implemented separately or combined in any way and/or combination.

BRIEF DESCRIPTION OF THE DRAWINGS

Aspects of the present disclosure are illustrated by way of example and are not limited by the accompanying drawings. In the drawings:

FIG. 4 illustrates functional elements of a SLAM system that performs sensor scheduling operations in accordance with some embodiments of the present disclosure;

DETAILED DESCRIPTION

Figure 1:
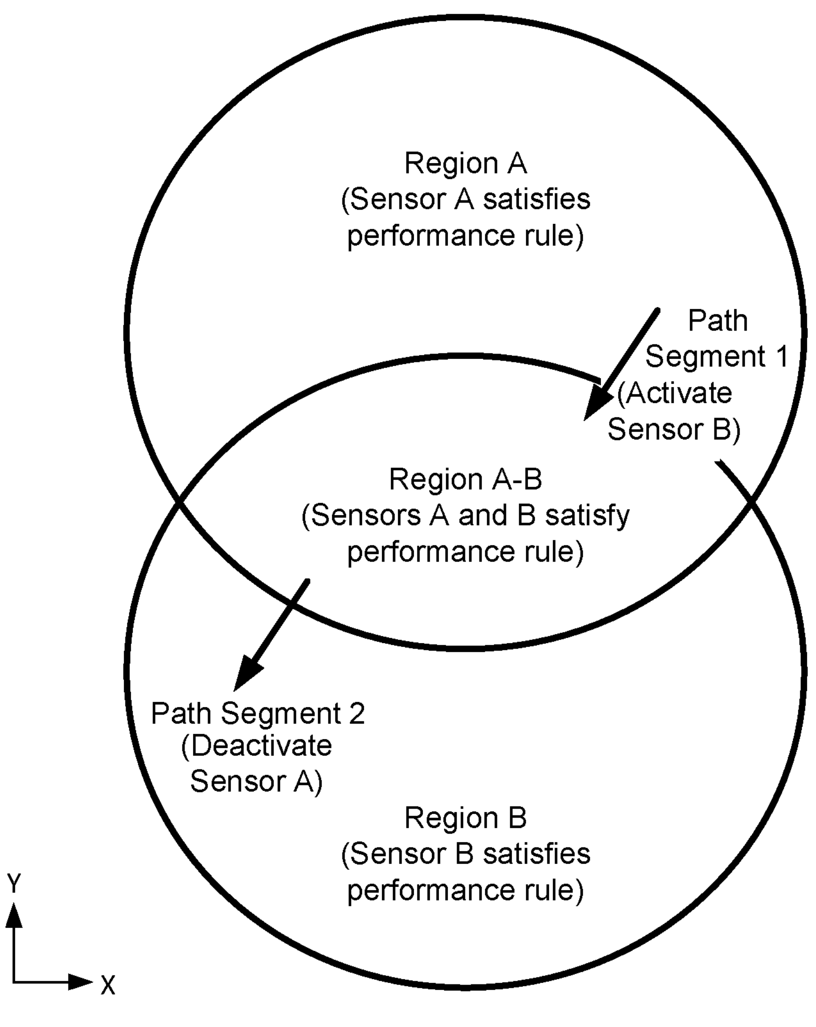
FIG. 1 illustrates a top view of a geographic map showing movement of a device between different regions and associated sensor activation/deactivation operations in accordance with some embodiments of the present disclosure.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

State-of-the-art solutions such as Microsoft Hololens, Magic Leap, ARCore, ARKit, etc., assume that all their on-board sensors need to be activated to perform localization or to perform localization and mapping, such as SLAM. This significantly affects the battery life of these devices. However, certain types of sensors are only operationally suitable for certain types of environments. For example, a thermal camera can provide more accurate sensor data than a RGB visible light camera in a very dark environment. Thus, it can be an unnecessary waste of energy and other resources to keep all sensors activated irrespective of their performance. Various embodiments herein are directed to controlling activation and deactivation of individual sensors considering power dissipation during data acquisition as well as the power consumed while processing the acquired data (CPU/GPU, memory, etc.) while performing localization or while performing combined localization and mapping (e.g., SLAM).

Any state-of-the-art device performing SLAM (e.g., augmented reality/virtual reality headsets, smartphones, semi-autonomous vehicles, robots, etc.) operates with all of its transported sensors activated. Although the environment in which the device operates can be static, the lighting conditions and other parameters experienced by the sensors can cause SLAM algorithms to generate inconsistent maps. Therefore, it is important to not only equip the device with various different types of sensors and/or differently configured sensors, but also to utilize the sensors in a more optimal manner. Various embodiments herein are directed to dynamically adapting which sensors are activated and deactivated during localization operations and/or during combined localization and mapping operations based on confidence scores that are determined for the sensors at certain regions.

Some further embodiments are directed to an efficient scheduling algorithm that determines a more optimal subset of sensors that are presently used for localization operations for a device within an environment, and which may be further used for mapping operations within the environment. Although some embodiments are described in the context of activating and deactivating sensors during SLAM operational processing, these embodiments are not limited to use with SLAM but instead can more generally be used to activate and deactivate sensors during localization operations or during combined localization and mapping operations which may or may not be based on SLAM.

The scheduling algorithm responds to the effect of changes in the characteristics of the environment on the various sensors when determining which sensors are to be activated or deactivated. The scheduling algorithm can operate to provide reduced power consumption and thus extend localization or combined localization and mapping (e.g., SLAM) operational time, and can improve other system resource utilization (e.g., processor utilization, memory utilization, network utilization, etc.). The scheduling algorithm can also operate to identify which sensors are most important for use in a specific environment and, thereby, enable more effective selection of which sensors will be transported by a device in that environment. One embodiment of the scheduling algorithm is configured to assume the characteristics of the environment remain static over time. For instance, the algorithm may be configured to assume that lighting conditions most affect the confidence score of an RGB camera. Moreover, assume that a device carrying a RGB camera sensor is to perform SLAM in a basement environment having fixed lighting and with no sunlight interference. The algorithm can be configured to identify that the RGB camera is providing to be a good sensor because it tracks adequate features, which the algorithm can then determine is an indication that any device carrying an RGB camera of the same type and make should perform well within that environment.

Various embodiments herein are described in the context of a device that transports a sensor payload $S=\{s_1, s_2, \ldots, s_N\}=\{s_i\}$. The term $|S|$ corresponds to cardinality of set S. The state $x_i$ of each sensor $s_i$ can be either 0 (deactivated) or 1 (activated). A deactivated state of a sensor can correspond to setting its respective sampling rate to a lower rate or zero, and the activated state of the sensor can correspond to setting its sampling rate to an increased rate or default value based on the current dynamics of the device. Alternatively or additionally, a deactivated state of a sensor can correspond to setting its respective resolution to a lower resolution or zero, and the activated state of the sensor can correspond to setting its resolution to an increased resolution or default value (sufficient to support localization) based on the current dynamics of the device. The power $e_i$ consumed by each sensor $s_i$ is estimated considering both the power dissipation of the sensor during data acquisition, as well as the power consumed while processing the acquired data in the SLAM thread.

Various embodiments herein select the most suitable combination of sensors based on their current performance at a certain region (performed online responsive to presently sensed condition), or upon their performance at a previous session stored in the SLAM map (performed offline). The system deactivates all non-selected sensors to reduce the total power consumption and other system resource utilization (e.g., processor utilization, memory utilization, network utilization, etc.). The localization and mapping algorithm, which can run on a separate thread, utilizes only the activated sensors at any time.

Figure 6:
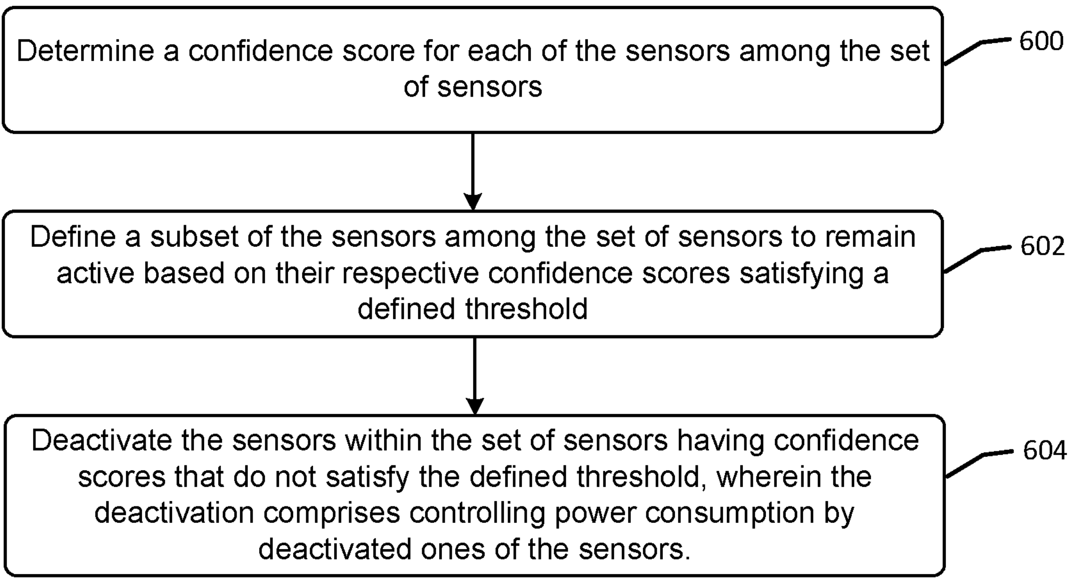
FIGS. 6 and 7 illustrate flowcharts of operations for controlling activation and deactivation of sensors used by a device for localization in accordance with some embodiments of the present disclosure.

Example operations for controlling activation and deactivation of a set of sensors that are used by a device to perform localization and/or to perform localization and mapping, e.g., SLAM, will now be explained with reference to FIGS. 1 and 6. FIG. 1 illustrates a top view of a geographic map showing movement of a device between different regions and associated sensor activation/deactivation operations in accordance with some embodiments of the present disclosure. FIG. 6 illustrates a flowchart of operations by a device performing localization using a set of sensors that are transported with the device in accordance with some embodiments of the present disclosure.

Referring to FIG. 6, operations by a device performing localization using a set of sensors that are transported with the device, include determining 600 a confidence score (λ_i) for each of the sensors (Si) among the set of sensors. The operations defined 602 a subset of the sensors among the set of sensors that are to remain active based on their respective confidence scores satisfying a defined threshold, e.g., being equal to or above a defined threshold value. The subset of sensors is preferably a non-empty set to ensure at least one sensor remains active. The operations then deactivate 604 the sensors within the set of sensors having confidence scores that do not satisfy the defined threshold, e.g., being less than the defined threshold value. The deactivation operations include controlling power consumption by deactivated ones of the sensors. The operation to compare the confidence scores of the sensors to a defined threshold can mean that the confidence scores for each of the sensors is compared to the same threshold value or can mean that different sensors may be associated with different threshold values such the confidence scores for each sensor would be compared to the associated threshold value for that sensor. Thus, the term "defined threshold" can mean a single value or a set of values that are associated with a set of sensors.

Referring to the illustrative example of FIG. 1, a geographic region A is illustrated where sensor A satisfies a performance rule, another geographic region B is illustrated where sensor B satisfies the performance rule, and an overlap region A-B is illustrated where both sensors A and B satisfy the performance rule. While a device transported sensors A and B is within region A, where only sensor A satisfies the performance rule, and outside region A-B sensor A actively feeds data to the localization algorithm or combined localization and mapping algorithm, e.g., SLAM algorithm, and sensor B is deactivated. When the device moves along path segment 1 from region A to region A-B, where sensors A and B both satisfy the performance rule, sensor B may be activated and sensor A may be deactivated depending upon the relative power consumption, localization performance, combined localization and mapping performance (e.g., SLAM performance), resource utilization, etc., of sensors A and B. As the device transporting moves along path segment 2 to region B and outside region A-B, sensor B actively feeds data to the localization algorithm or combined localization and mapping algorithm, e.g., SLAM algorithm, and sensor A is deactivated.

Figure 2:
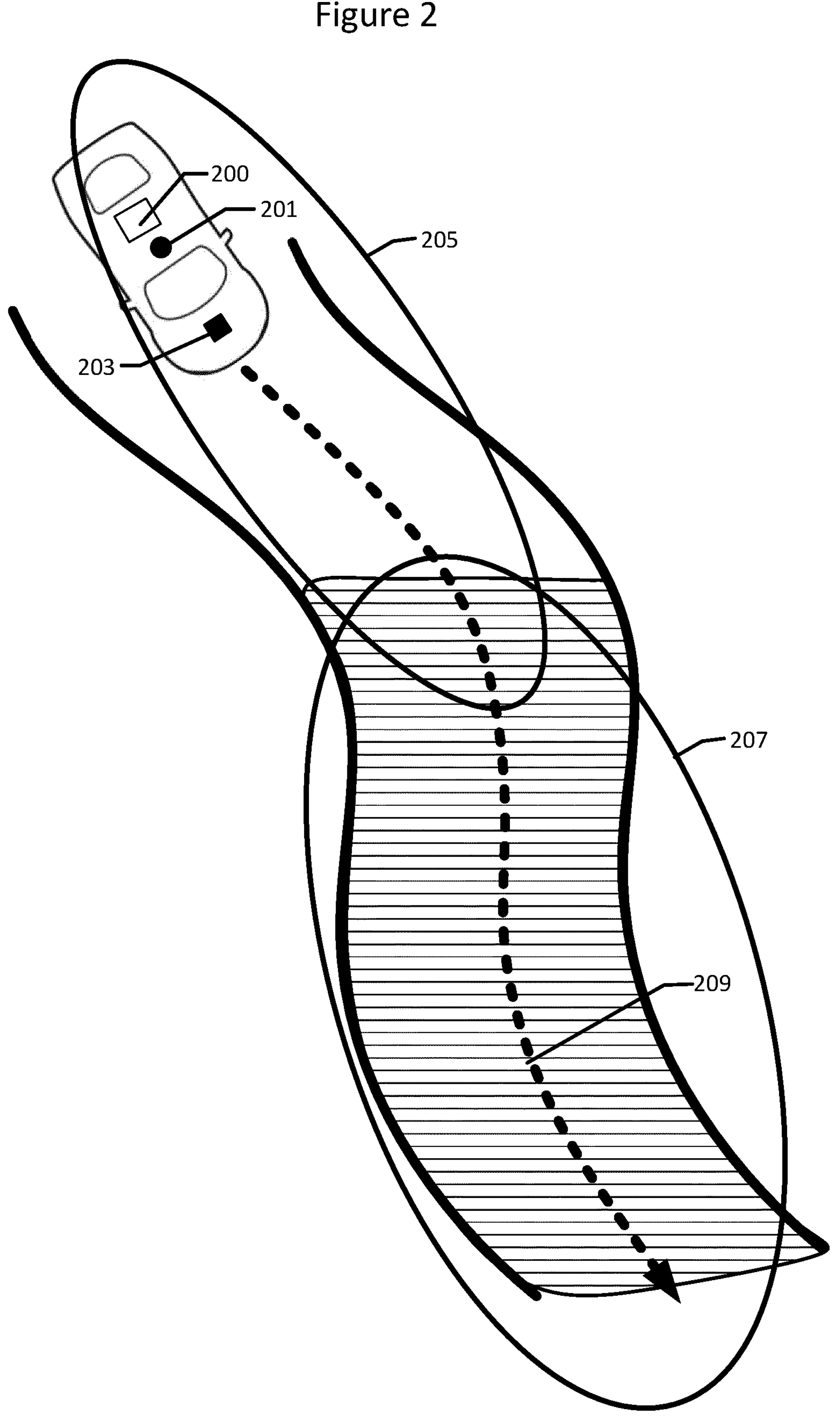
FIG. 2 illustrates a top view of a geographic map showing movement of a vehicle transporting a device and a set of sensors through an example environment in accordance with some embodiments of the present disclosure.

FIG. 2 illustrates a top view of a geographic map showing movement of a vehicle transporting a device 200 and a set of sensors 201 and 203 through an example environment. The device and sensors may be transported in other manners, such as by a human, robot, aircraft (e.g., drone), ship, etc. The device 200 can be, but is not limited to, a component of any of a smartphone, wearable computer, augmented reality headset, virtual reality headset, mixed reality headset, semi-autonomous or autonomous vehicle, drone, aircraft, robot, etc. Although only two sensors are illustrated is to be understood that the computing device may be used with any plural number of sensors that are configured to feed data to a SLAM algorithm. Example types of sensors include, but are not limited to, RGB camera, infrared camera, inertial measurement unit (IMU), radar sensor, light detection and ranging (LiDAR) sensor, acoustic ranging sensor, proximity sensor, GPS, and RF transceiver (e.g., 5G-radio). A confidence score is determined for the first sensor 201 and the second sensor 203 to determine if the first sensor 201 and the second sensor are appropriate for the location and characteristics of the environment where the device 200 is located.

Referring to FIG. 2, the below methods for calculating the confidence scores of sensors and activating and deactivating sensors may be exemplified by the vehicle transporting the computing device 200, a first sensor 201 and a second sensor 203 along the path 209 (e.g., road) through an environment. As the vehicle travels along the path 209 it performs various operations discussed in embodiments of the present disclosure. For example, in a first region 205 the first sensor 201 is determined by the computing device 200 to satisfy a defined rule which causes activation or keeping the first sensor 201 activated while the vehicle remains in the first region 205. The vehicle travels into a second region 207 where the computing device 200 determines that the first sensor 201 delivers a confidence score that does not satisfy a defined threshold, e.g., less than a defined threshold. Two alternative operational embodiments can be triggered by the computing device 200. In one embodiment, the unsatisfactory confidence score of the first sensor 201 causes all of the onboard sensors that were previously deactivated (in this case only the second sensor 203) to be reactivated and analyzed to determine which of the reactivated sensors yields confidence scores that satisfy the defined threshold. In another embodiment, the operations refer to an available localization and mapping, e.g., SLAM map, data structure that identifies one or more sensors that were activated and provided satisfactory confidence scores in the past in the second region 207, and the operations responsively activate the one or more sensors. The operations can deactivate the first sensor 201 to reduce power consumption and conserve other system resources, e.g., processing, memory, communications, etc.

In accordance with various embodiments herein, the operations for controlling activation and deactivation of sensors used by a device for localization and/or combined localization and mapping, are performed responsive to confidence scores which are determined for the sensors. The confidence score is a metric that indicates trustworthiness in the accuracy of data that can be provided by a sensor or a set of sensors at a location or in an environment having certain characteristics and/or features that are sensed by one or more of the sensors. The confidence score of a sensor is highly correlated to the performance of the localization algorithm or combined localization and mapping (e.g., SLAM algorithm) using data from the sensor. Operations that can be used to determine the confidence score of a sensor for use in localization processing or combined localization and mapping processing, e.g., SLAM processing, are explained below.

In some embodiments, the confidence score $\lambda_i$ is defined as a function of the inline ratio of visual features that are detectable in data from a sensor. If no feature is detected then the confidence score of the sensor is zero. Otherwise, for a non-zero number of inlier and outlier detected features, the confidence score $\lambda_i$ of sensor $s_i$ can be determined based on the following equation:

$$\lambda_i = \frac{1}{F}\sum_{f=1}^{F}\frac{\#\text{inliers}}{\#\text{inliers} + \#\text{outliers}}$$

In the above-equation, #inliers and #outliers are the number of inliers and outliers, respectively, of features detected in frame f of a sensor data stream, and F is the number of consecutive frames for which the confidence score is calculated. Although the example equation is described in the context of detection of visual features and a sensor data stream, the disclosed operations for determining the confidence score can be used with any type of feature with a specified descriptor that is identifiable in sensor data.

Thus, in a more general embodiment, the confidence score for one of the sensors can be determined 600 based on a ratio of a number of inlier features to a total number of inlier and outlier features detected by the sensor. Each of the inlier features has characteristics that are consistent with a defined model, and each of the outlier features has characteristics that are inconsistent with the defined model.

An assumption of this embodiment is that the sensor or data includes "inliers", i.e., data whose distribution can be operationally determined using a defined set of model parameters, but may also be subject to noise, and "outliers" which are data that do not fit the model. The outliers can occur, for example, from extreme values of the noise or from erroneous sensor measurements or incorrect hypotheses operations interpreting the sensor data.

In some embodiments, for each sensor $s_i$, the operations for controlling activation and deactivation of a sensor retrieve the number of inliers and outliers for a number of consecutive frames of data from the sensor. The number of inliers and outliers may be determined by a feature tracking module (FTM) operating for each sensor, which can be an essential component of the localization algorithm or combined localization and mapping algorithm and therefore should not increase the computational overhead. An FTM for a sensor, such as a camera, can detect and track keypoints. The positions of features within the sensor data are keypoints within images from a camera sensor.

There are multiple ways to determine descriptors of features to detect and track keypoints. Descriptors of keypoints may include, but are not limited to, Binary Robust Invariant Scalable Keypoints (BRISK), Fast Retina Key-Points (FREAK), Speeded Up Robust Features (SURF), Scale-invariant Feature Transform (SIFT), Oriented FAST and Rotated BRIEF (ORB), Features from Accelerated Segment Test (FAST), Binary Robust Independent Elementary Features (BRIEF). Different descriptors can be used for different types of sensors (e.g.: depth kernel descriptors can be used for depth sensors). In vision-based SLAM, random sample consensus (RANSAC) is commonly used for geometric verification and outlier detection. The set of inliers and outliers of the tracked features can be calculated based on operations described in a publication Buczko, Martin & Willert, Volker, "How to Distinguish Inliers from Outliers in Visual Odometry for High-speed Automotive Applications" (2016) 10.1109/IVS.2016.7535429.

Figure 5:
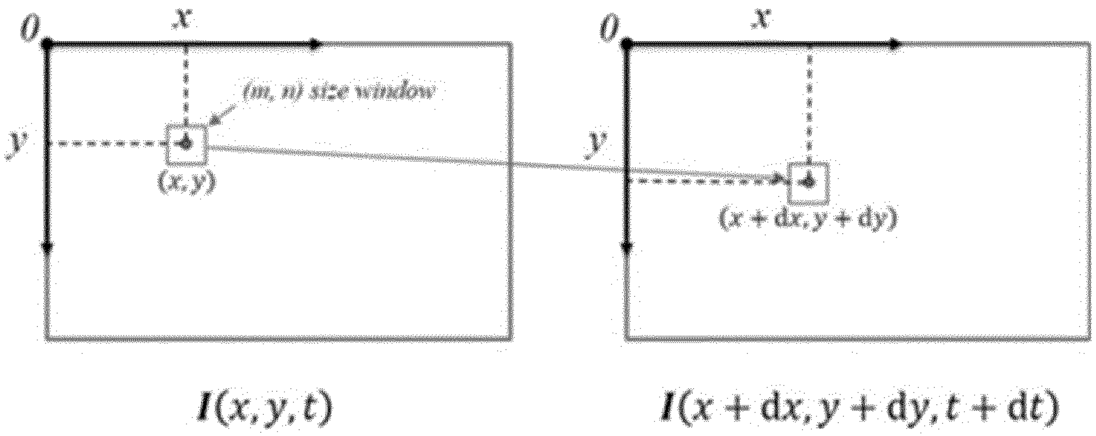
FIG. 5 illustrates operations of a feature tracking algorithm for a SLAM system configured according to some embodiments of the present disclosure.

A 2D feature tracked in an image captured by a visual sensor (e.g., RGB camera) can be operationally considered to be an outlier when the respective image registration fails to find the spatial transformation required for that feature to be matched in a sequence of images. An example of 2D feature tracking is illustrated in FIG. 5. FIG. 5 illustrates operations of a feature tracking algorithm for a SLAM system configured according to some embodiments of the present disclosure. In FIG. 5, a feature located at I(x,y) in sensor frame (t) is determined to subsequently move to location I(x+dx, y+dy) in sensor frame (t+dt).

A 3D feature/segment detected in a point cloud created by a range sensor (e.g. LiDAR) is operationally considered to be an outlier when the respective point cloud registration fails to find a spatial transformation required for that feature/segment to be matched in a sequence of point clouds.

Inliers can be distinguished from outliers by operation of the RANSAC algorithm. An example algorithm that separates inliers and outliers among a set of matches between two images mapped by an affine transform is described in the publication Beckouche, Simon, et al. "Robust Outliers Detection in Image Point Matching." 2011 *IEEE International Conference on Computer Vision Workshops,* 2011, pp. 180-187.

In one embodiment, the confidence score is determined based on how oscillatory the position of the tracked features is between consecutive frames of sensor data. In one embodiment, the confidence score for one of the sensors is determined 600 based on an amount of oscillation that is determined to occur between positions of features within sensor data obtained in consecutive sampling frames. The amount of oscillation that is determined to occur in the position of a certain feature is tracked in consecutive frames of a sensor.

For example, in a sensor including a camera, although the 2D position of a specific feature might be changing due to motion of the device transporting the sensor, the global 3D position of the feature should remain constant. If the mapping of the 2D position of the feature from consecutive frames onto the 3D space yields back 3D positions that fluctuate more than some threshold, that means the performance of the sensor is poor.

In another embodiment, the confidence score for one of the sensors is determined 600 based on a signal-to-noise ratio (SNR) of the sensor compared to a defined threshold. The more oscillating the position of the tracked features, the higher the likelihood that the SNR of the sensor is too low, and therefore, the information added to the localization processing or combined localization and mapping processing is an insufficiently low value. The sampling rate of the sensor may be relatively slow compared to the dynamics of the device, so localization processing could fail to produce accurate results or combined localization and mapping processing operation could fail to produce consistent maps.

In another embodiment, the confidence score for one of the sensors is determined 600 based on determining localization of the sensor relative to a map defined by a data structure identifying local features that have been previously sensed by one or more sensors, and determining the confidence score for the one of the sensors based on whether the sensor presently senses the local features identified by the data structure defining the map. An existing map may be exploited to evaluate the set of sensors currently being used. For instance, if the device has managed to localize within an available map, but certain features in its surrounding are not observed as expected from the map, then this may be an indication that the set of sensors currently being used is, for various reasons (e.g., different lighting conditions, reflective surfaces, moving objects in the room, etc.), not suitable for the current environment.

In another embodiment, the confidence score for one of the sensors is determined 600 based on determining localization of the sensor relative to a map defined by a data structure identifying positions of local features, and determining the confidence score for the one of the sensors based on comparison of where the sensor identifies the positions of the local features to where the data structure identifies the positions of the local features. Landmarks with known geometry, dimensions, and position in the room may be used as partial ground truth which enables the operations to determine localization error as an estimate of error in the device's pose. The operations can use the localization error to determine confidence in the data from the sensor.

In another embodiment, the confidence score for one of the sensors is determined 600 based on localization of the sensor to locations within a map defined by a data structure which identifies performance of sensors at the locations. Performance for the sensor is retrieved from the data structure based on the localization to the locations within the map. The confidence score is then determined based on the retrieved performance.

When determining 600 the confidence score, the data structure of the map may be stored in a networked data repository that is accessed by the operations.

As explained above, the operations to deactivate 604 a sensor may include one of triggering the sensor to transition to a lower power state and triggering power off of the sensor. Alternatively or additionally, the operations to deactivate 604 a sensor include setting a data sampling rate of the sensor to one of a reduced sampling rate and zero.

In some embodiments, the operations to define 602 the subset of the sensors among the set of sensors (201 and 203) to remain active is performed based on a combination of their respective confidence scores and an amount of similarity in operation of the sensors. For example, if the confidence score of sensor $s_i$ exceeds a predefined confidence threshold $\mu_i$, then this sensor may belong to set $S_B$ defined by $$S_B=\{s_i|s_i\in S_A \wedge \lambda_i \geq \mu_i\},$$

where $\mu_i$ depends on the specifications of the sensor in ideal environmental conditions. If $|S_B|>0$, then at least one sensor has exceeded its respective confidence threshold, and the operations can deactivate the sensors that do not belong in $S_B$. Otherwise, no sensor gets deactivated and the operation is skipped. These operations can operate to bias the set of active sensors to be more diversified in their operational characteristics as described in further detail below.

In some embodiments, a set of sensors, Sc, are defined to remain active, where $S_C \subseteq S_B$, based on their utilization of hardware resources and their overall confidence score. Referring to the operational flowchart of FIG. 7, the device selectively deactivates 700 individual ones of the sensors within the subset of sensors based on a determination of whether their respective utilization of hardware resources satisfies a defined rule. Example hardware resources can include, but are not limited to, any one or more of power consumption, processor utilization, memory utilization, and network communication utilization.

The total number of combinations of activated sensors is $2^{|S_B|}-1$. Each combination $\xi$ results in a utilization of hardware resources $E_\xi$, and an overall confidence score $\Lambda_\xi \in (0,1]$ can be defined so that homogeneity is penalized. In some embodiments, the subset of the sensors is defined 602 to penalize inclusion of sensors that have more than a threshold level of similarity in operation. This penalty may depend on how disjunct parts of the environment two or more homogeneous sensors observe. The variety of different sensors enrich the representation of the surroundings using complementary information, and the precision of the measurements is improved by using redundant information. This step is completed in three sequential sub-steps:

a. Exclude the combinations of sensors for which $E_\xi$ exceeds a predefined threshold $\varepsilon$.
b. From the remaining combinations select the ones with the highest number of active sensors.
c. Select the optimal combination $\xi^*$ for which $\Lambda_\xi$ is maximized.

In some embodiments, the overall confidence is the weighted average of the individual confidence scores where each weight $w_i$ depends on the frequency of occurrence of sensor $s_i$ in the combination $\xi$ so that homogeneity is penalized. The overall score can be described by $$\Lambda_\xi = \frac{1}{\sum_{i=1}^{N} x_i} \sum_{i=1}^{N} w_i \cdot x_i \cdot \lambda_i, \text{ where } w_i = (1-p)^{M_i-1}.$$

$x_i$ denotes the state of the sensor $s_i$ (0: idle, 1: active) in combination $\xi$, N denotes the total number of sensors on-board, p is the penalizing factor ($0 \leq p \leq 1$), and $M_i \in \mathbb{Z}^+$ is the frequency of occurrence of sensor $s_i$ in combination $\xi$.

A potential advantage is that these operations bias the set of active sensors to be more diversified in their operational characteristics, which can make the localization processing or combined localization and mapping processing have more robust performance as the device and sensors travel through environments having widely differing characteristics, e.g., ambient light brightness variations, light/RF surface reflectivity, recognizable surface feature density, feature ranges, sensed ambient noises, ambient interference, etc.

In another embodiment, the overall confidence $\Lambda_\xi$ score can be estimated based upon a machine learning (ML) algorithm where different combinations of sensors are used to evaluate the performance of the localization algorithm or combined localization and mapping algorithm, e.g., SLAM algorithm. After collecting significant amount of data from several sensors for different regions within a given environment, the overall confidence score of each combination for specific regions can be evaluated with greater accuracy. These operations can function to generate a performance profile for each sensor correlated with different geographic regions.

In one embodiment, the operations for the device select the most suitable set of sensors $S_C$ based upon the set of sensors which are currently being used by its nearest neighbor device (collaborative localization or collaborative combined localization and mapping). This saves resources and time, as the operations do not need to evaluate the device's own sensors' performance in an online fashion, since it trusts its nearest neighbor device's decisions assuming the neighbor device's sensors have the same or sufficiently similar operational characteristics, e.g. same sensor type and manufacturer, as those being transported by the device.

In another embodiment, the operations select the most suitable set of sensors $S_C$ based upon the overall confidence score $\Lambda_\xi$ stored from previous sessions for different regions. The map generated from the combined localization and mapping algorithm, e.g., SLAM algorithm, is split into grids, and in each grid the overall confidence score $\Lambda_\xi$ for each combination $\xi$ is stored. This way, in future sessions of the same or a different operations of a device, if the performance of the currently activated sensors degrades, the operations will directly activate the most suitable set of sensors by retrieving their overall confidence score $\Lambda_\xi$ from the grid the device is moving towards, and will accordingly deactivate the poorly performing sensors. This will save power since there is no need to activate the entire set of the on-board sensors for online evaluation.

Figure 7:
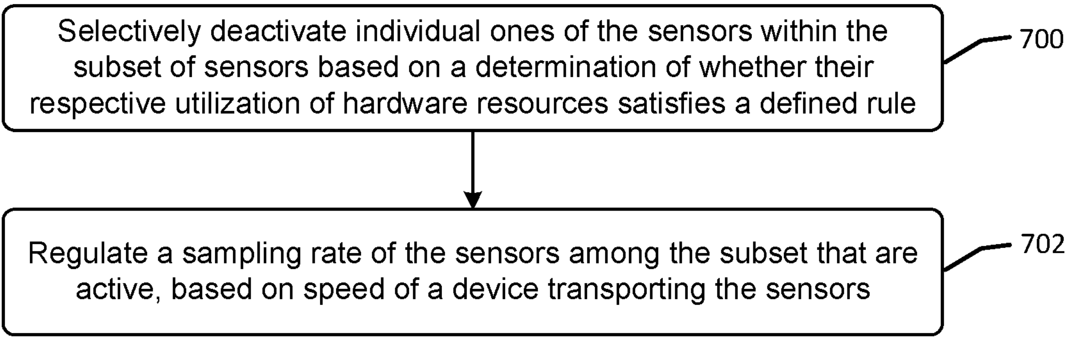

With further reference to FIG. 7, the operations may regulate 702 a sampling rate of the sensors among the subset that are active, based on speed of the device transporting the sensors. In other words, if the confidence score of sensor $S_i$ is above a predefined threshold, and if the dynamics of the device carrying the sensor payload are slow, then its respective sampling rate is decreased in a way that the confidence score remains beyond a certain value.

The notion of fast/slow dynamics is application-dependent. For fast dynamics of the device or its environment, the operations can be performed at higher sensor sampling rates so that enough information is captured by the sensors to characterize the environment. In contrast, for slower dynamics combined with high enough confidence scores, the sampling rate of the sensors can accordingly be decreased, resulting in lower power consumption and lower data bandwidth. In case the localization algorithm or combined localization and mapping algorithm is implemented in a distributed manner where the front-end operations are performed by sensors and computing resources on the device and the back-end operations runs either on the edge, or on the cloud, or on a more powerful (in terms of CPU, memory, etc.) neighboring device, reduction of the data bandwidth results in decreased communication cost. When the relative dynamics of the device and its environment are faster than what the device's sensors can capture while sampling at their maximum rates, the localization algorithm could be risk of producing insufficient accuracy output or the combined localization and mapping algorithm could be at risk of failing to produce consistent maps.

In some embodiments the device's dynamics control the rate with which the decision process of sensor activation/deactivation takes place. Thus, the operations to deactivate 604 a sensor may include setting a data sampling rate of the sensor to one of a reduced sampling rate and zero.

Figure 3:
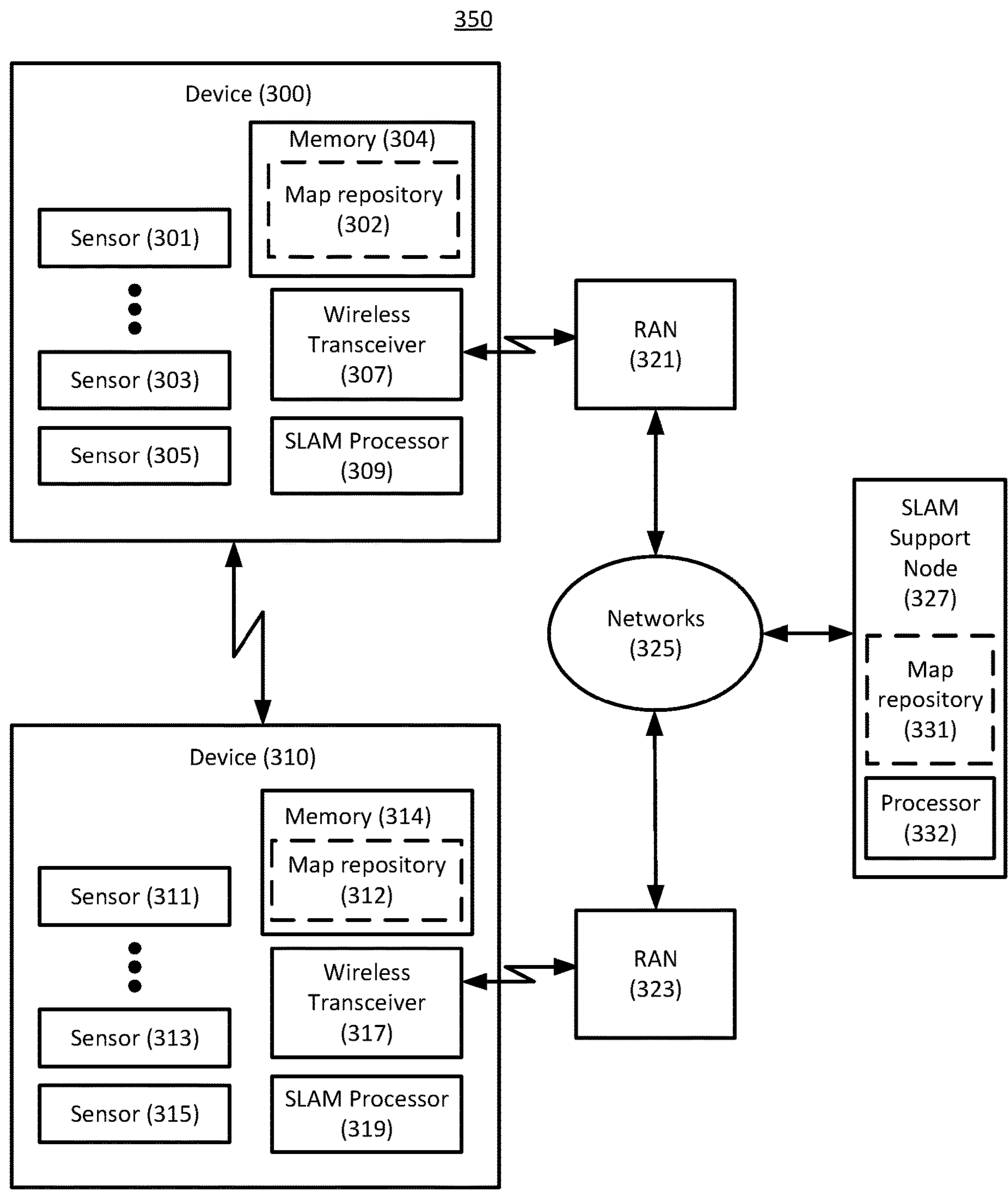
FIG. 3 illustrates a SLAM system that includes a pair of computing devices, sensors, and a SLAM support node which operate in accordance with some embodiments of the present disclosure.

FIG. 3 illustrates a SLAM system 350 that includes a pair of devices, sensors, and a SLAM support node which operate in accordance with some embodiments of the present disclosure. Although the system of FIG. 3 is described in the context of activating and deactivating sensors during SLAM processing, the embodiments that are described are not limited to use with SLAM but instead can more generally be used to activate and deactivate sensors during localization operations or during combined localization and mapping operations which may or may not be based on SLAM A first device 300 can include or be operationally connected to a first set of sensors 301, 303, and 305 that can be transported with the first device 300. A second device 310, which is proximately located to the first device 300, can include or be operationally connected to a second set of sensors 311, 313, 315 that can be transported with the second device 310. The first device 300 and the second device 310 can be, but are not limited to, a component of any of a smartphone, wearable computer, augmented reality headset, virtual reality headset, mixed reality headset, semi-autonomous or autonomous vehicle, aircraft, robot, ship, etc. The first device 300 and the second device 310 and their connected sensors are transportable in any manner, such as by a person, vehicle, drone, aircraft, ship, robot, etc. Example types of sensors include, but are not limited to, RGB camera, infrared camera, inertial measurement unit (IMU), radar sensor, light detection and ranging (LiDAR) sensor, acoustic ranging sensor, proximity sensor, GPS, and RF transceiver (e.g., 5G-radio).

The first device 300 includes a SLAM processor 309, a memory 304, and a wireless transceiver 307 that can communicate with the second device 310 and/or SLAM support node 327 via a radio access node (RAN) 321 or 323. The processor 309 is operationally connected to the first set of sensors 301, 303, 305. The memory 304 stores program code that is executed by the processor 309 to perform operations, and may store a map repository 302. The operations performed by the SLAM processor can include: determining a confidence score for each of the sensors among the set of sensors; defining a subset of the sensors among the set of sensors 301, 303, 305 that are to remain active based on their respective confidence scores satisfying a defined threshold; and deactivating the sensors within the set of sensors 301, 303, 305 having confidence scores that do not satisfy the defined threshold. The deactivation can include controlling power consumption by deactivated ones of the sensors.

As explained above, the operation to compare the confidence scores of the sensors to a defined threshold can mean that the confidence scores for each of the sensors is compared to the same threshold value or can mean that different sensors are associated with different threshold values such the confidence scores for each sensor would be compared to the associated threshold value for that sensor. Thus, the term "defined threshold" can mean a single value or a set of values that are associated with a set of sensors. Some further embodiments are directed to various operations for determining one or more threshold values against which the sensor confidence scores are compared. In one embodiment, each subregion of the environment, within which the device 300 is moving, can be associated in a map with a confidence score of each sensor (first set of sensors 301, 303, 305) transported with the device 300. Each subregion of the environment may also be associated with a performance metric of the localization algorithm processing data from a coupled sensor. In one embodiment, given N sensors, the data stream from each sensor can be fed into N localization and mapping algorithms running in parallel. Each localization algorithm outputs an estimate of the pose (e.g., position and orientation) of the device. One performance metric of the localization algorithm could be the absolute error between the output estimate and a trusted pose of the device. The trusted pose can be obtained via any one of more of the following three methods:

1. obtained from an external motion capture (tracking) system communicatively connected to the device; or
2. obtained from a high-quality independent positioning system transported with the device; or
3. obtained from one of the sensors among the first set of sensors 301, 303, 405 that is determined to currently provide the highest confidence score.

Once enough pairs of confidence score and absolute error have been obtained for each sensor among the first set of sensors 301, 303, 405, the operations can determine the relationship between the absolute error and the confidence score for each sensor. The threshold that is used for a particular one of the sensors can be determined based on the determined relationship between the absolute error and the confidence score for the sensor, in order to provide a desired localization performance when performing operations to selectively switch between sensors.

In a corresponding operational embodiment, the defined threshold includes a set of threshold values, each of the threshold values in the set is associated with a different one of the sensors in the set, and the threshold value for one of the sensors in the set is determined based on comparison of a trusted present pose of the device to a pose that is output from localization performance using data from the sensor.

As also explained above, the operations define a subset of the sensors among the set of sensors that are to remain active. The subset of sensors is preferably a non-empty set. In other words, the device will not deactivate all sensors which would otherwise make it impossible to continue to perform localization of the device. However, in some environment situations it is possible that all the sensors will deliver a confidence score below their thresholds. In this case the threshold values are too low and can be changed based on the present environment. Assuming the operations has initially set a desired level of performance (e.g. absolute error below some threshold), the thresholds should be retuned (decreased) to the point at which the performance metric is not violated. Since this retuning will take place in an online (e.g., real-time) fashion, the sensor with the highest confidence score will be used as reference (trusted). Alternatively, different levels of performance can be associated with different thresholds for each sensor. When the performance metric changes level, the information can be stored in the geographic map. The operations can be adapted to the maximum achievable performance and tune the respective thresholds responsive thereto. In the worst-case scenario that the performance metric needs to go below some critical value (e.g. below this value the localization application cannot run or the localization algorithm fails and does not provide a pose estimate), then an indicative message can be stored in the geographic map, so that if any of the current sensors will visit (different device) or revisit (same device) the current subregion in the future, then the operations can determine that the localization algorithm should be expected to fail.

The second device 310 can be configured similarly to the first device 300. The second device 310 transports a set of sensors 311, 313, 315 and includes a SLAM processor 319, a wireless transceiver 317, and a memory 314 storing program code that is executed by the processor (319) to perform operations. The processor is operationally connected to the set of sensors 311, 313, 315.

The first device 300 and/or the second device 310 can be configured to contain all program code and related circuitry needed to perform operations to control sensor activation and deactivation and perform localization operations and may further perform mapping operations, such as SLAM algorithm processing. At least some of the localization and/or mapping operations, may be performed by a networked node, such as the illustrated SLAM support node 317. The devices 300 and 310 can be configured to communicate with the SLAM support node 317 via one or more of the RANs 321 and 323 and the networks 325. The SLAM support node 327 includes a processor 332 that can be configured to perform some or all of the operations for activating and deactivating sensors according to one or more of the embodiments disclosed herein. The SLAM support node 327 may store the MAP repository 331 that can be used to determine which sensors to activate or deactivate, and to determine when to activate or deactivate sensors.

FIG. 4 illustrates functional elements of a SLAM system that performs sensor scheduling operations in accordance with some embodiments of the present disclosure. Referring to FIG. 4, the SLAM system includes a sensor-scheduling-thread functional block 401, a slam-thread functional block 403, a set of sensors $S_1$, $S_2$, $S_n$, a battery 409, and a sensor control block having a sampling regulator 421 and a power mode controller 422.

The sensor-sensor-scheduling-thread functional block 401 is configured to perform operational steps that include: activating (STEP 411) a set of sensors $S_A$; determining (STEP 412) number of inliers and outliers for each sensor $s_i$ among a set of sensors; determining (STEP 413) a confidence score $\lambda_i$ to each sensor $s_i$; defining (STEP 414) a subset of the sensors $S_B$ among the set of sensors $S_A$ to remain active based on their confidence score ($S_B \subseteq S_A$); defining (STEP 415) set of sensors $S_C$ to remain active based on their utilization of hardware resources and their overall confidence score ($S_C \subseteq S_B$); and regulating (STEP 416) the sampling rate of sensors based on the device's dynamics, e.g., translational speed, rotational speed, etc., and/or the environment's dynamics, e.g., sunrise/sunset timeframe, high contrast shadow occurrence density, etc.

Referring to FIG. 4, the slam-thread functional block 403 is configured to perform SLAM operations. The slam-thread functional block 403 includes front-end operations 405 and back-end operations 407. Front-end operations 405 may include good features determination functions 431, feature tracking functions 433, outlier detection functions 435, sensor fusion functions 437, data association functions 439, and localization functions 441. The back-end operations 407 may include map merging functions 443, map summarization functions 445, map optimization functions 447, and map estimation functions 449.

The sensor control functional block activates and deactivates the set of sensors $S_1$, $S_2$, and $S_n$ through operations performed by a sampling regulator 421 that controls sensors' sampling rate and/or through operations performed by a power mode controller 422 that controls power consumption by the sensors.

FURTHER DEFINITIONS AND EMBODIMENTS

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A method by a device performing localization using a set of sensors that are transported with the device, the method comprising:

determining a confidence score ($\lambda_i$) for each of the sensors ($S_i$) among the set of sensors, wherein the confidence score ($\lambda_i$) is indicative of accuracy of data that can be provided by the sensor in an environment where the sensor is located;

defining a subset of the sensors among the set of sensors that are to remain active based on their respective confidence scores satisfying a defined threshold; and deactivating the sensors within the set of sensors having confidence scores that do not satisfy the defined threshold, wherein the deactivation comprises controlling power consumption by deactivated ones of the sensors, wherein the defining of the subset of the sensors among the set of sensors to remain active is performed based on a combination of their respective confidence scores of the sensors in the subset and an amount of similarity in operation of the sensors in the subset, wherein the defined threshold comprises a set of threshold values, each of the threshold values in the set is associated with a different one of the sensors in the set, wherein the threshold value for one of the sensors in the set is determined based on comparison of a trusted present pose of the device to a pose that is output from localization performance using data from the sensor.

2. The method of claim 1, further comprising selectively deactivating individual ones of the sensors within the subset of sensors based on a determination of whether their respective utilization of hardware resources satisfies a defined rule.

3. The method of claim 1, wherein the confidence score for one of the sensors is determined based on a ratio of a number of inlier features to a total number of inlier and outlier features detected by the sensor.

4. The method of claim 1, wherein the subset of the sensors is defined to penalize inclusion of sensors that have more than a threshold level of similarity in operation.

5. The method of claim 1, wherein the confidence score for one of the sensors is determined based on obtaining a listing of sensors that are presently active for use by a proximately located device.

6. A device configured for performing localization using a set of sensors that are transportable with the device, the device comprising:

a processor operationally connected to the set of sensors;

a memory storing program code that is executed by the processor to perform operations to:

determine a confidence score ($\lambda_i$) for each of the sensors ($S_i$) among the set of sensors, wherein the confidence score ($\lambda_i$) is indicative of accuracy of data that can be provided by the sensor in an environment where the sensor is located;

define a subset of the sensors among the set of sensors that are to remain active based on their respective confidence scores satisfying a defined threshold; and deactivate the sensors within the set of sensors having confidence scores that do not satisfy the defined threshold, wherein the deactivation comprises controlling power consumption by deactivated ones of the sensors, wherein the defining of the subset of the sensors among the set of sensors to remain active is performed based on a combination of their respective confidence scores of the sensors in the subset and an amount of similarity in operation of the sensors in the subset, wherein the defined threshold comprises a set of threshold values, each of the threshold values in the set is associated with a different one of the sensors in the set, wherein the processor is further configured by the program code to determine threshold value for one of the sensors in the set based on comparison of a trusted present pose of the device to a pose that is output from localization performance using data from the sensor.

7. The device of claim 6, wherein the processor is further configured by the program code to selectively deactivate individual ones of the sensors within the subset of sensors based on a determination of whether their respective utilization of hardware resources satisfies a defined rule.

8. The device of claim 7, wherein the hardware resources comprise at least one of power consumption, processor utilization, memory utilization, and network communication utilization.

9. The device of claim 6, wherein the processor is further configured by the program code to regulate a sampling rate of the sensors among the subset that are active, based on speed of the device.

10. The device of claim 6, wherein the confidence score for one of the sensors is determined based on a ratio of a number of inlier features to a total number of inlier and outlier features detected by the sensor.

11. The device of claim 10, wherein each of the inlier features has characteristics that are consistent with a defined model, and each of the outlier features has characteristics that are inconsistent with the defined model.

12. The device of claim 6, wherein the confidence score for one of the sensors is determined based on an amount of oscillation that is determined to occur between positions of features within sensor data obtained in consecutive sampling frames.

13. The device of claim 12, wherein the positions of features within the sensor data are keypoints within images from a camera sensor.

14. The device of claim 6, wherein the confidence score for one of the sensors is determined based on a signal-to-noise ratio (SNR) of the sensor compared to a defined threshold.

15. The device of claim 6, wherein the confidence score for one of the sensors is determined based on determining localization of the sensor relative to a map of an environment defined by a data structure containing features that have been previously sensed by one or more sensors, and determining the confidence score for the one of the sensors based on whether the sensor presently senses the features contained in the data structure defining the map.

16. The device of claim 6, wherein the confidence score for one of the sensors is determined based on determining localization of the sensor relative to a map of an environment defined by a data structure containing positions of features, and determining the confidence score for the one of the sensors based on comparison of where the sensor identifies the poses of the features to where the data structure identifies the poses of the features.

17. The device of claim 6, wherein the confidence score for one of the sensors is determined based on localization of the sensor to locations within a map of an environment defined by a data structure which identifies performance of sensors at the locations, retrieving from the data structure performance for the sensor based on the localization to the locations, and determining the confidence score based on the retrieved performance.

18. The device of claim 6, wherein the confidence score for the one of the sensors is determined based on accessing the data structure of the map stored in a networked data repository.

19. The device of claim 6, wherein the deactivation of a sensor comprises one of triggering the sensor to transition to a lower power state and triggering power off of the sensor.

20. The device of claim 6, wherein the deactivation of a sensor comprises setting a data sampling rate of the sensor to one of a reduced sampling rate and zero.

21. The device of claim 6, wherein the subset of the sensors is defined to penalize inclusion of sensors that have more than a threshold level of similarity in operation.

22. The device of claim 6, further comprising:

a transceiver, wherein the processor is further configured by the program code to:

communicate through the transceiver with a proximately located device, wherein the confidence score for one of the sensors is determined based on obtaining from the proximately located device a listing of sensors that are presently active for use by the proximately located device.

* * * * *